Sept. 18, 1923.
W. C. ONG
COFFEE POT ATTACHMENT
Filed Sept. 7, 1922
1,468,411
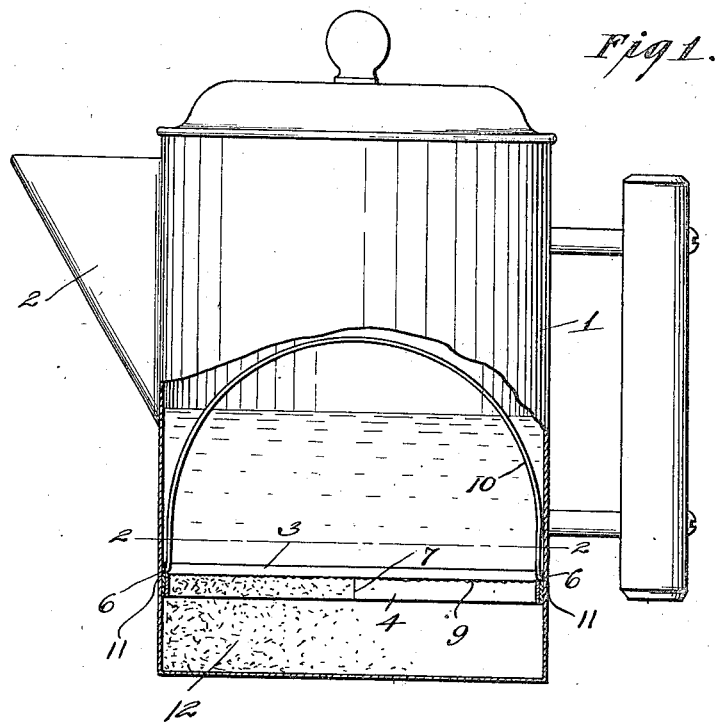
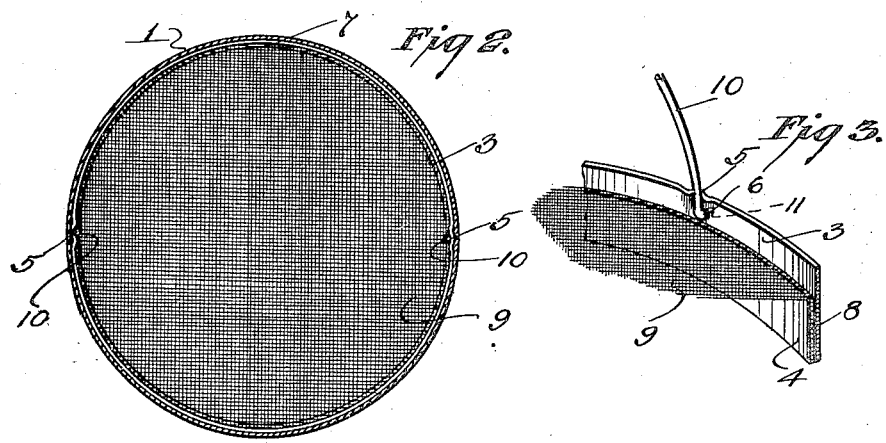
Inventor
Walter C. Ong
By C. C. Shepherd
Attorney Patented Sept. 18, 1923.

1,468,411

UNITED STATES PATENT OFFICE.

WALTER C. ONG, OF COLUMBUS, OHIO.

COFFEEPOT ATTACHMENT.

Application filed September 7, 1922. Serial No. 586,564.

*To all whom it may concern:*

Be it known that I, WALTER C. ONG, a citizen of the United States, residing at Columbus, in the county of Franklin and State of Ohio, have invented certain new and useful Improvements in Coffeepot Attachments, of which the following is a specification.

The present invention is directed to improvements in attachments for coffee pots and has for its primary object to provide an attachment of this character so constructed that it can be conveniently placed in the pot to retain the coffee grounds therein when the beverage is being poured therefrom.

A further object of the invention is to provide an attachment of this nature which is extremely simple in construction, efficient in operation, and one which can be manufactured at a very small cost.

A still further object of the invention is to provide an attachment in the nature of a strainer which can be readily placed in or removed from the coffee pot and when in place will prevent the coffee grounds from commingling with the beverage as it is poured from the pot.

With these and other objects in view, as will appear as the description proceeds, the invention consists in the novel features of construction, combinations of elements and arrangements of parts, and hereinafter to be fully described and pointed out in the appended claims.

Figure 1 is a side elevation of the pot, partly in section, showing the invention in place therein.

Figure 2 is a sectional view on line 2—2 of the Figure 1.

Figure 3 is a fragmentary detailed perspective view of the attachment.

Referring to the drawing 1 designates a coffee pot provided with the usual pouring spout 2, said pot being of a conventional construction.

The attachment comprises concentrically arranged rings 3 and 4, the former having its upper edge disposed above the plane of the latter, and is provided at diametrically opposed points with elongated seats 5, and located adjacent the lower ends of these seats are perforations 6, the purpose of which will appear later.

The ring 4 is split, as at 7 so that it can be conveniently placed within the confines of the ring 3. The ring 4 serves to clamp the skirt 8 of the fabric sheet 9 in tight engagement with the ring 3 so that the major portion of the sheet will be stretched tightly and substantially in a plane with the upper edge of the ring 4. This fabric is preferably formed from cloth, but it will be of course understood that wire mesh may be used or any other material suitable for the purpose may be utilized.

A handle bail 10 is provided and has its ends provided with horizontal pintles 11, which are adapted to detachably engage the perforations 6, and when the lower ends of the bails are engaged in the seats 5, said handle bail will be held in a vertical position and can be conveniently manipulated to insert or remove the attachment from the coffee pot.

Since the handle bail 10 is formed from resilient wire, it is obvious that the same will yieldably engage the seats 5 to prevent accidental tilting thereof, but at the same time it can be contracted to permit the pintles 11 to be conveniently removed from the perforations 6.

In use, the attachment is placed in the pot in the position as shown in Figure 1 of the drawing, thereby confining the grounds 12 a considerable distance below the spout 2, and since the attachment is of such diameter as to snugly engage the interior of the pot, the same will be held against accidental movement when the pot is tilted to pour the beverage therefrom. Thus it will be seen that when the attachment is in place that the grounds 12 will be so confined that the possibility of the grounds commingling with the beverage as it is poured from the pot is positively eliminated.

It will be observed that the lower end of the handle bail 10 is located in close proximity to the upper edge of the inner ring 4, and it will be obvious that when the attachment is forced into the coffee pot and in contact with the grounds therein that the pressure exerted on the fabric sheet 9 can not cause the ring 4 to move upwardly since the upper edge thereof will contact with the lower end of said bail.

What is claimed is:—

1. An attachment of the class described, comprising inner and outer rings, a sheet of fabric having its skirt confined between the rings, the outer ring having aligned seats and perforations formed therein, a handle bail having pintles for detachably engaging the perforations, the lower ends of said bail being yieldably engaged in said seats and above the upper edge of the inner ring to limit the upward movement thereof.

2. An attachment of the class described, comprising inner and outer rings, the outer ring having its upper edge disposed above the plane of the inner ring, the said inner ring being split, a sheet of fabric having its skirt confined between said rings, a handle bail pivotally and detachably engaged with the outer ring.

In testimony whereof I affix my signature.

WALTER C. ONG.